United States Patent [19]
Lassig, Jr.

[11] Patent Number: 6,050,177
[45] Date of Patent: Apr. 18, 2000

[54] MULTI-FUEL, FUEL ISOLATED COOKER

[76] Inventor: O. L. Lassig, Jr., 12017 Ladrido La., Austin, Tex. 78727

[21] Appl. No.: 09/203,885

[22] Filed: Dec. 2, 1998

[51] Int. Cl.$^7$ ..................................................... A47J 37/00
[52] U.S. Cl. .............................. 99/340; 99/401; 99/467; 99/482; 126/25 R; 126/41 R; 126/39 BA; 126/273 R
[58] Field of Search ............................. 99/340, 482, 339, 99/401, 487, 467; 126/25 R, 41 R, 39 BA, 273 R

[56] References Cited

U.S. PATENT DOCUMENTS

| | | | |
|---|---|---|---|
| 2,882,890 | 4/1959 | Shaw | 126/273 R |
| 4,706,643 | 11/1987 | Tyson | 126/25 R |
| 4,796,601 | 1/1989 | Yamada | 126/299 R |
| 4,813,397 | 3/1989 | Yamada | 126/299 R |
| 4,877,015 | 10/1989 | Yamada | 126/299 R |
| 4,934,260 | 6/1990 | Blevins | 99/482 |
| 5,515,774 | 5/1996 | Swisher et al. | 99/340 |
| 5,524,610 | 6/1996 | Clark | 126/41 R |
| 5,711,209 | 1/1998 | Guines | 99/340 X |

*Primary Examiner*—Reginald L. Alexander

[57] ABSTRACT

A charcoal, gas or electric-fired, fuel-isolated cooker comprising: an outer box separated by rigid insulation from an inner box, a multi-level cooking grill with a detachable grease catchpan, a heat chamber to isolate food from fuel source and to provide an additional hot surface for grilling items such as bread, removable cooking spikes, an optional flavor chip box, insulated handles, magnetized utensil hooks, a magnetically secured door, solid fuel, gas manifold or electric heating element holders, and an extendable vent pipe for use with solid fuel(charcoal briquettes) or gas combustion options.

5 Claims, 10 Drawing Sheets

MULTI-FUEL, FUEL ISOLATED COOKER

BACKGROUND OF THE INVENTION

1. Field of the Invention

The present invention relates to a multi-fuel, fuel isolated cooker capable of cooking meats and vegetables very uniformly without the risk of scorching or overcooking and without placing foodstuffs in direct contact with the combustible fuel source. This fuel source, when in direct contact with food, is thought to be potentially carcinogenic due to the presence of hydrocarbons.

2. Description of Prior Art

Charcoal or gas are the two combustible fuel sources for cookers commonly known as "backyard barbecue grills"; these cookers are typically not insulated, provide for only one type of fuel option and place the food to be cooked in direct contact with the fuel source, flame and hydrocarbons during the cooking process. Three recent patents, Yamada, U.S. Pat. Nos. 4,796,601, 4,813,397, 4,877,015 are examples of such prior art.

Yamada's smokeless cooker is meant to vent the smoke from the meat during the cooking process but the food is still in direct contact with the fuel source and any hydrocarbons contained in the fuel source.

Further, Yamada's smokeless cooker still allows the food to become overcooked since the only thing that separates the food to be cooked from the fuel source is a gridiron. It is true that Yamada's art conducts the gases produced by the combustible fuel source away from the operator of the cooker but the gases remain in full contact with the food.

The potentially carcinogenic effects due to hydrocarbons on cooked meat is discussed in several recent medical/nutrition articles such as Grilling and Cancer Risks by Patti Schuman, R.D (supplemental information attached); all of the prior art has failed to address this potentially harmful effect.

SUMMARY OF THE INVENTION

Accordingly, it is an object of the present invention to provide a multi-fuel source cooker capable of isolating the combustible fuel source from the food being cooked.

It is another object of the present invention to provide a well-insulated cooking area to minimize the amount of energy required to achieve and maintain a given cooking temperature.

It is another object of the present invention to provide a door that provides insulation but could be opened from the inside if necessary.

It is another object of the present invention to provide for easy removal and cleaning of the cooker door.

It is another object of the present invention to provide a method to minimize the presence of the carcinogens known as polynuclear aromatic hydrocarbons in the cooking area.

It is another object of the present invention to provide a feature to cook ear corn or other such vegetables concurrent with the grilling of meat.

It is another object of the present invention to provide a feature to permit toasting of bread or the warming of other foods concurrent with the grilling of meat.

It is another object of the present invention to provide a feature to permit the optional addition of wood smoke or wood smoke flavor to the meat cooking process.

It is another object of the present invention to provide for the storage of cooking utensils on the exterior of the cooker.

DESCRIPTION OF THE PREFERRED EMBODIMENT

Figure 1:
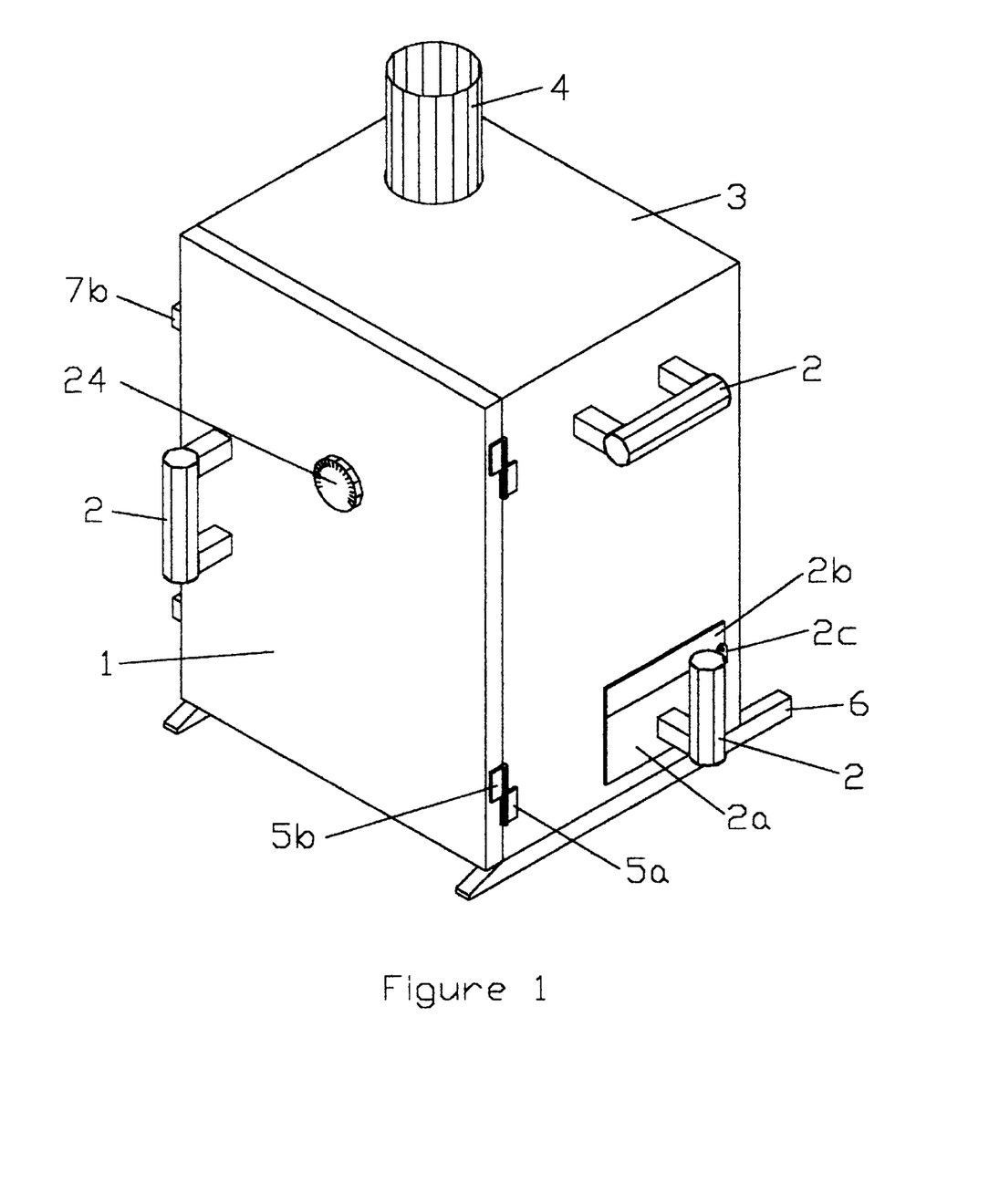
FIG. 1 is a perspective view showing the external appearance of a multi-fuel, fuel isolated cooker, in a preferred embodiment, according to the present invention.

Referring to FIG. 1, a multi-fuel, fuel isolated cooker is comprised of an external box (3) made of stainless steel or other material that will withstand high temperature and remain chemically inert, a hinged door (1) with door seal (1a), (shown in FIG. 2), secured by ceramic magnets (7b), (7a shown in FIG. 2), hanging on separable or loose hinges (5a,b), resting on wooden insulating rails (6) with wooden insulating handles (2) and a fuel drawer (2a) with convection baffle (2b) and a drawer safety latch (2c). An extendable flu (4) vents gases from the combustion area. Cooking temperature is monitored by an analog bimetal thermometer (24). A digital thermometer could also be used but is not shown.

Figure 2:
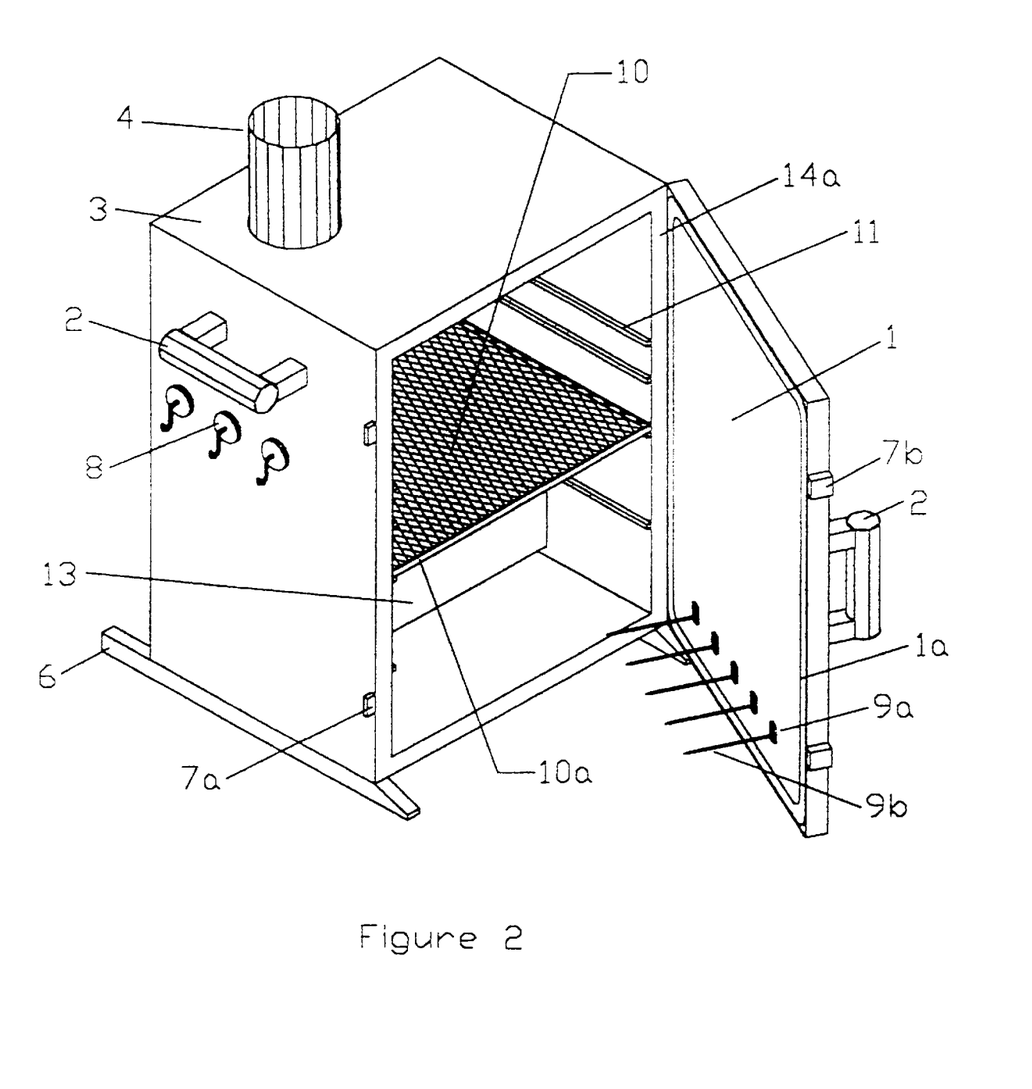
FIG. 2 is a perspective view showing a partial internal view of the present invention with door open.

Referring to FIG. 2, the inside of the multi-fuel, fuel isolated cooker is comprised of a gridiron (10) resting on top of a stainless steel grease catchpan (10a) supported by stainless steel guide rails (11). Fuel is combusted inside of the combustion chamber (13) and an option is provided to add smoke or smoke flavor from heated wood chips or smoke flavor sauce in a wood chip or wood flavor box (12, shown in FIG. 3) that rests on top of the combustion chamber (13). Removable vegetable spikes (9a,b) are provided to hold items such as baking potatoes or ear corn during the meat cooking process. Energy required for achieving and maintaining cooking temperature is minimized by double-wall insulation behind a stainless steel faceplate (14a). As an added convenience, magnetized utensil holders (8) are provided on the exterior of the cooking box.

Figure 3:
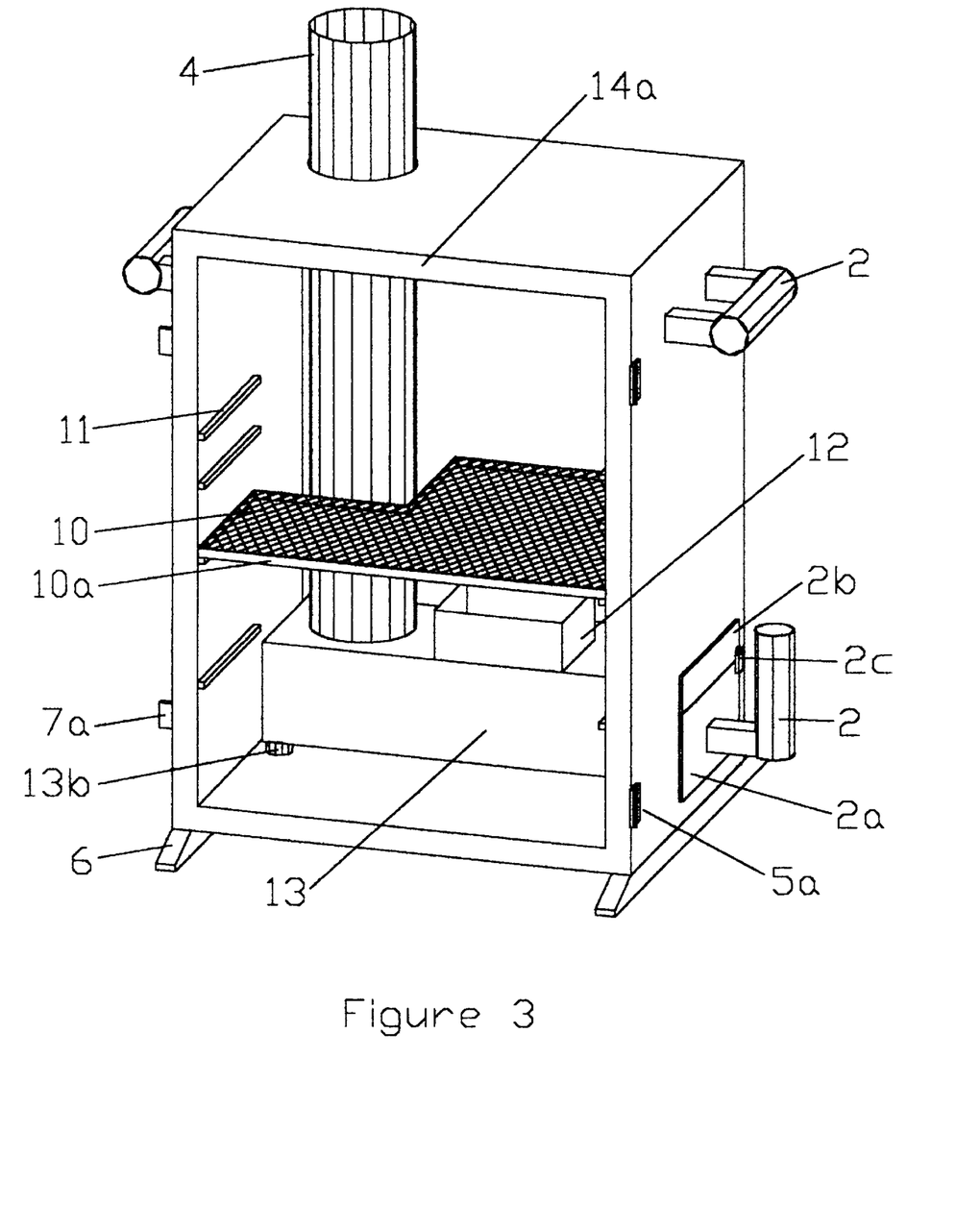
FIG. 3 is another perspective view of the present invention with door removed.

Referring to FIG. 3, another internal view of the multi-fuel, fuel isolated cooker reveals the stainless steel combustion chamber (13), which can hold the optional wood chip/flavor box (12) or serve as a grilling surface (13a) for bread or a warming surface (1 3a) for other foods such as beans. The combustion chamber is supported by stainless steel rods (13b) with a small surface area. The stainless steel faceplate (14a) covering the insulation between the double walls is also shown.

Figure 4:
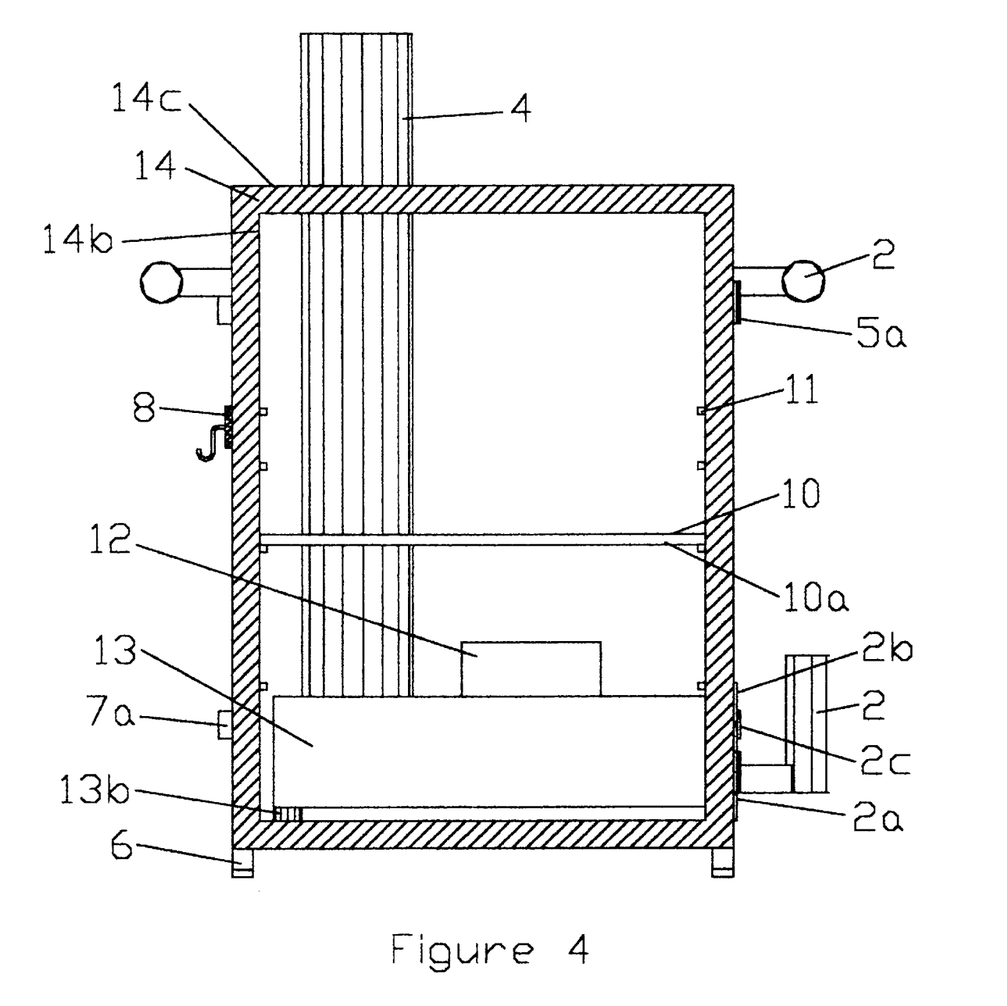
FIG. 4 is a plane frontal view of the present invention with door removed showing the double walled insulation feature.

Referring to FIG. 4, a plane view of the multi-fuel, fuel isolated cooker shows the rigid insulation (14) that separates the inner box (14b) from the outer box (14c). The rigid insulation can be any rigid insulation commercially available with the ability to withstand high temperature and remain chemically inert. FIG. 4 also shows the flu (4) penetrating the combustion box (13) through a welded seal, insulating wooden handles (2) and insulating wooden rails (6). The wood chip/flavor box (12) is also shown in place on the combustion chamber (13).

Figure 5:
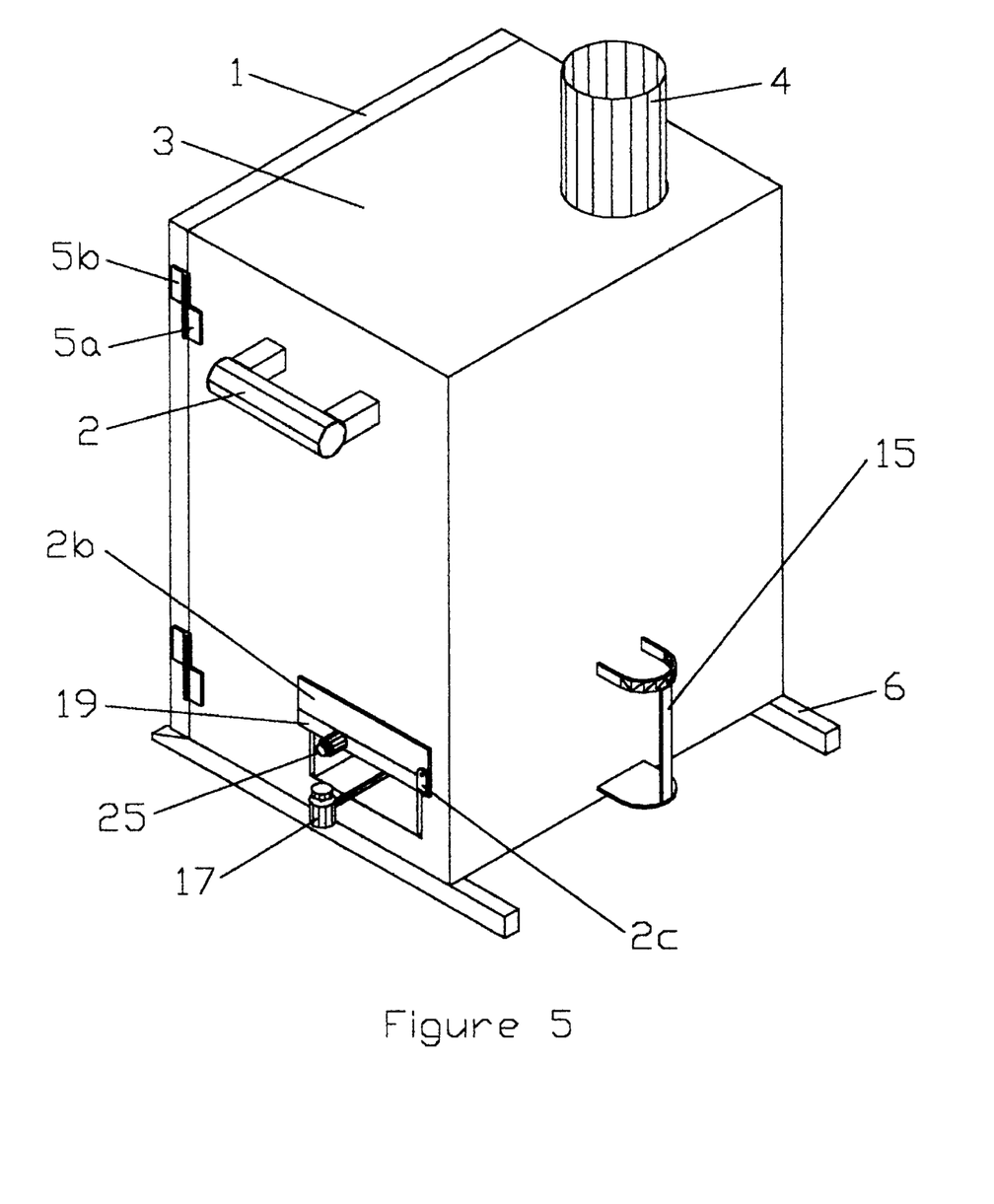
FIG. 5 is a perspective view from the rear of the present invention showing external features.

Referring to FIG. 5, another perspective external view of the multi-fuel, fuel isolated cooker shows optional gas manifold drawer (18), gas connection and burner control knob (17), piezoelectric igniter button (25), drawer stop (19) and the optional propane tank holder (15).

Figure 6:
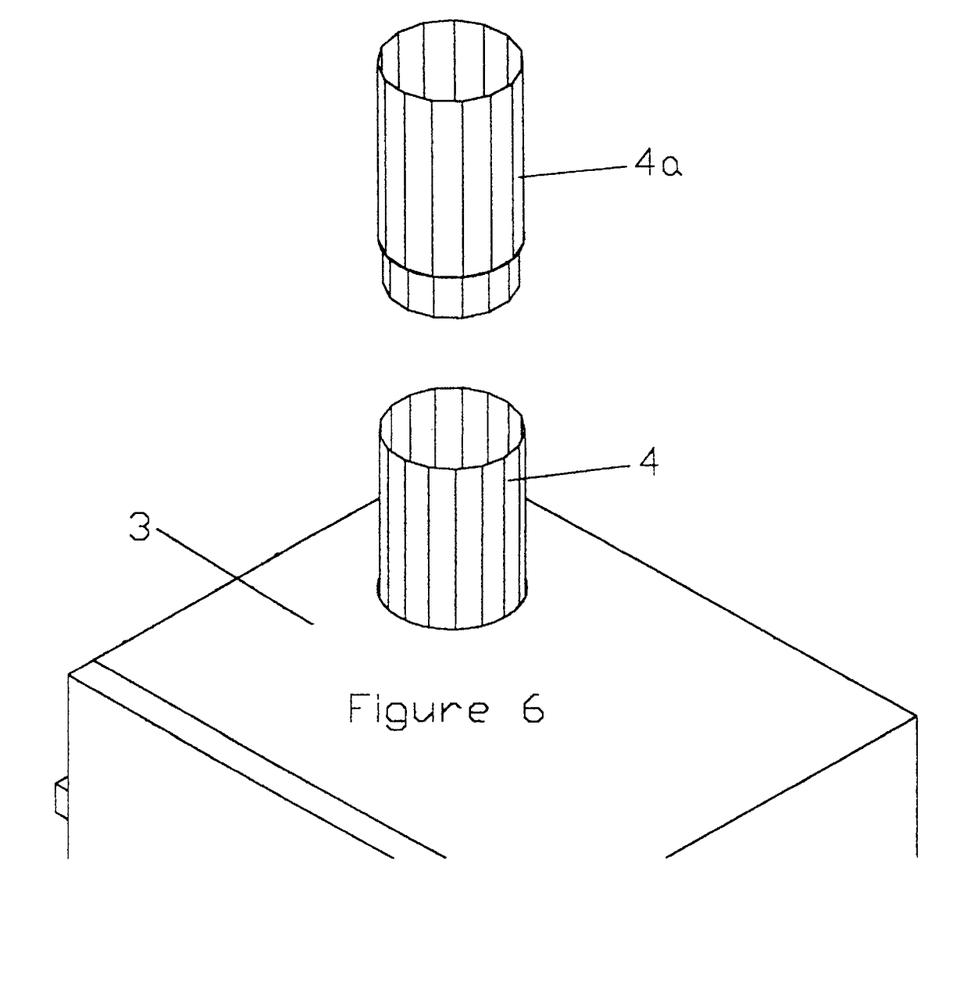
FIG. 6 is a perspective view of the exhaust flu with its variable length feature.

Referring to FIG. 6, perspective external view shows the extendable flu (4, 4a) penetrating the exterior surface (3) of the cooker through a welded seal. Flu is used to conduct gases from the combustion area when using solid or gas fuel option.

Figure 7:
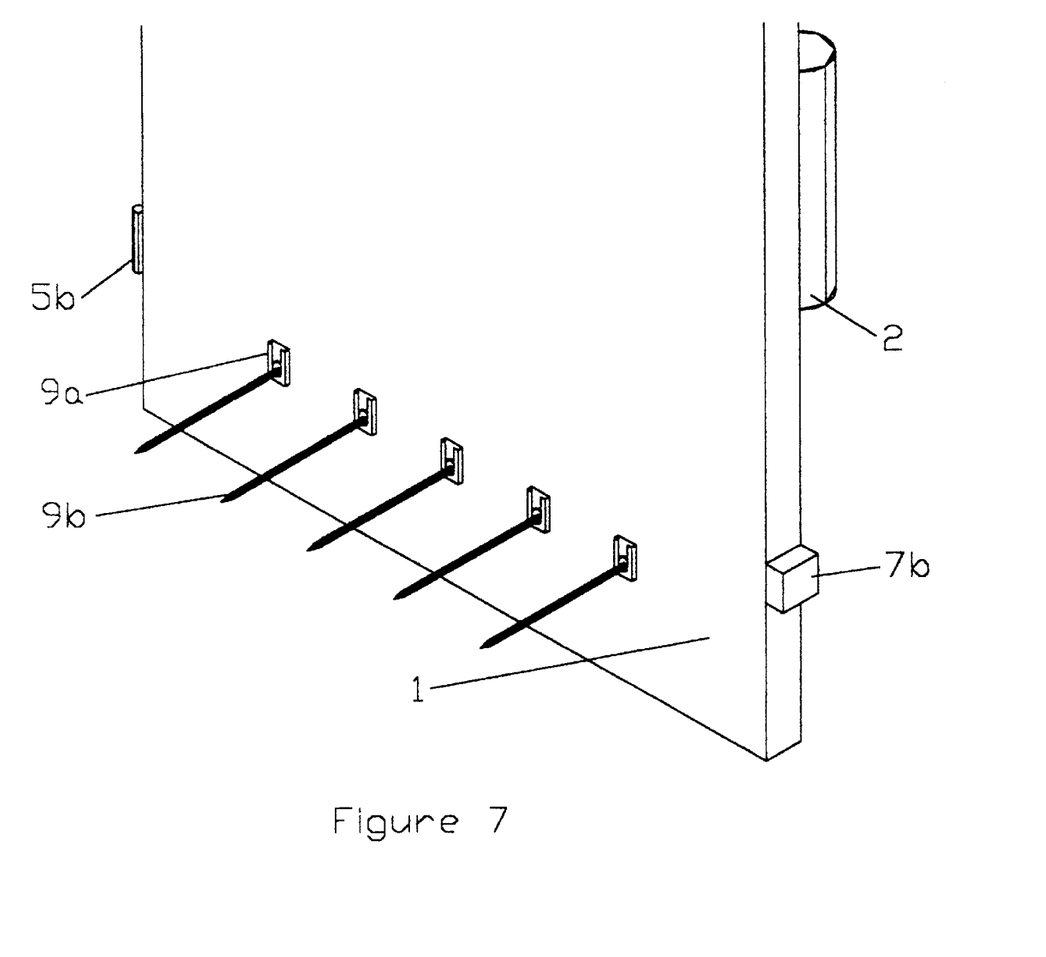
FIG. 7 is a perspective view of the inside of the door showing the removable vegetable cooking spikes.

Referring to FIG. 7, perspective view shows the door interior (1), wooden handle (2), separable hinge (5b), ceramic door magnet (7b), vegetable spike holder (9a) and the removable vegetable spike (9b).

Figure 8:
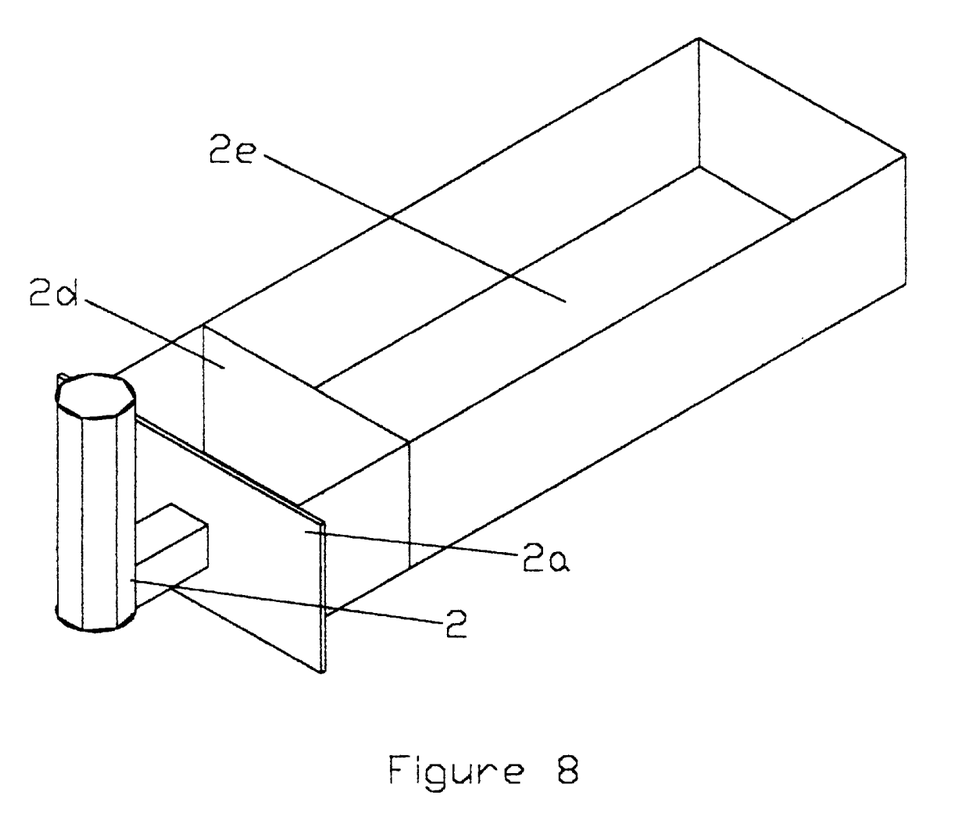
FIG. 8 is a perspective view of the solid combustible fuel drawer.

Referring to FIG. 8, perspective view shows the optional solid combustible fuel drawer (2a), insulating wooden handle (2), solid combustible fuel retainer plate (2d) and the solid fuel holding compartment (2e).

Figure 9:
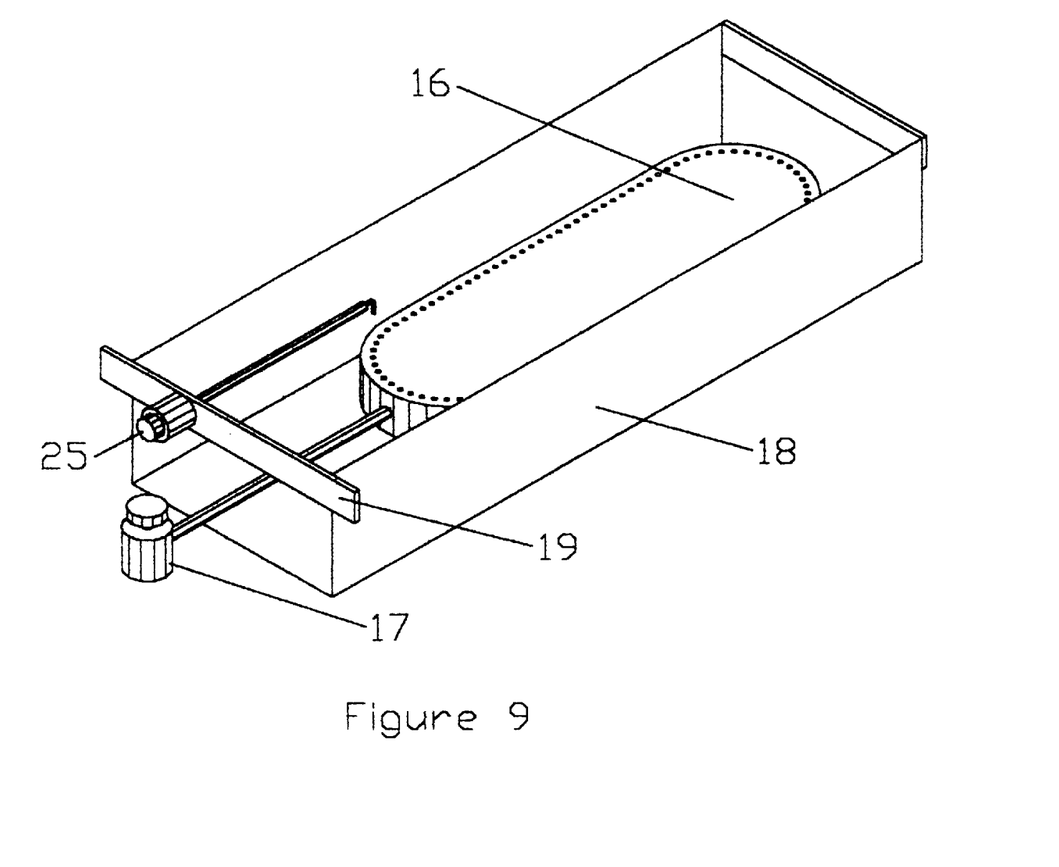
FIG. 9 is a perspective view of the LPG manifold fuel drawer insert.

Referring to FIG. 9, perspective view shows the optional LPG fuel drawer insert (18), drawer stop (19), gas connection and burner control (17), piezoelectric igniter button and assembly (25) and gas manifold burner assembly (16). The LPG burner assembly (16) is shown welded to the bottom of the fuel drawer (18).

Figure 10:
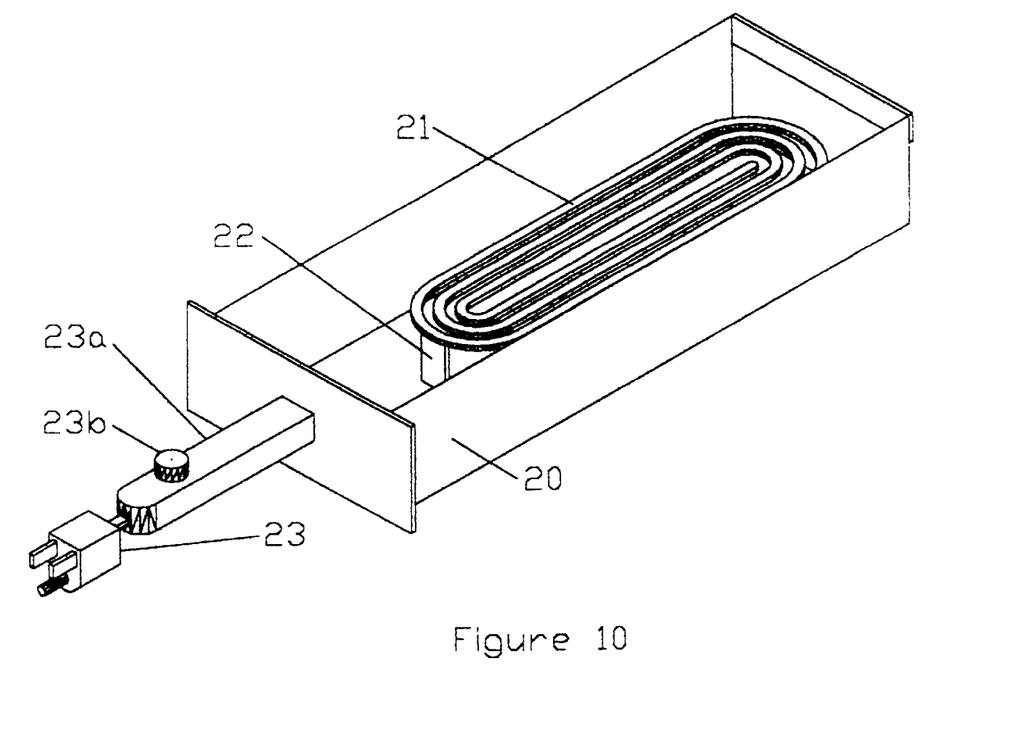
FIG. 10 is a perspective view of the electric heat element drawer.

Referring to FIG. 10, perspective view shows the optional electric heat element drawer (20) with a 500 watt heating element (21), element retaining clip (22), drawer stop (19), 110 volt male electrical plug (23) and heating element control (23b).

Although the invention has been described in a preferred form with a degree of specificity, it is to be understood that the present invention is not limited in practical application to the specific embodiment described herein; many changes and variations are possible in the invention without departing from the scope and spirit thereof, such as an increase in scale or the addition of wheels to increase mobility.

What is claimed is:

1. A multi-fuel, fuel isolated cooker comprising:
   (a) a cooking unit formed so as to create an enclosed cooking space with a door for inserting and removing food to be cooked; and
   (b) a combustion box for containing and completely isolating fuel and fuel by-products from said food configured inside said cooking unit so that food within the cooking unit is cooked by heat from the fuel within the combustion box but food is completely isolated from direct contact with the fuel and fuel by-products; and
   (c) an exhaust flue connected to said combustion box for exhausting said fuel by-products from said combustion box whereby said exhaust flue completely prevents any fuel by-products from entering said cooking unit.

2. The cooker of claim 1 wherein the cooking unit further comprises said enclosed cooking space formed by double walls separated by high temperature insulation.

3. The cooker of claim 1 wherein said combustion box further comprises a moveably connected fuel combustion drawer for inserting and withdrawing said fuel within said combustion box.

4. The cooker of claim 1 wherein said fuel comprises one of a group including solid fuel, gas, and electric.

5. A multi-fuel, fuel isolated cooker comprising:
   (a) a cooking unit with double walls separated by high temperature insulation formed so as to create an enclosed cooking space with a door for inserting and removing food to be cooked;
   (b) a combustion box horizontally configured inside said enclosed cooking space for containing and isolating fuel and fuel by-products so that food within the cooking unit is cooked by heat from the fuel within the combustion box but food is isolated from direct contact with the fuel and fuel by-products;
   (c) a fuel combustion drawer moveably connected to said combustion box for inserting and withdrawing said fuel within said combustion box;
   (d) a safety latch connected to said combustion drawer for securing said fuel combustion drawer;
   (e) an extendable flue connected to said combustion box for venting combustion gases from said combustion box so that said combustion gases do not enter said enclosed cooking space;
   (f) side rails connected to the enclosed cooking space for supporting a moveable cooking surface within said enclosed cooking space; and
   (g) removably attachable vegetable spikes connected to the inner surface of the door.

* * * * *